US011408982B2

(12) United States Patent
Okada et al.

(10) Patent No.: US 11,408,982 B2
(45) Date of Patent: Aug. 9, 2022

(54) ELECTROMAGNETIC WAVE DETECTION APPARATUS, PROGRAM, AND ELECTROMAGNETIC WAVE DETECTION SYSTEM

(71) Applicant: KYOCERA Corporation, Kyoto (JP)

(72) Inventors: Hiroki Okada, Machida (JP); Eri Uchida, Yokohama (JP); Hiroyuki Minagawa, Yokohama (JP); Yoshiteru Takayama, Susono (JP); Mitsuo Ono, Mitaka (JP); Atsushi Hasebe, Yokohama (JP); Katsutoshi Kawai, Ichinomiya (JP); Yukitoshi Kanayama, Yokohama (JP)

(73) Assignee: KYOCERA Corporation, Kyoto (JP)

(*) Notice: Subject to any disclaimer, the term of this patent is extended or adjusted under 35 U.S.C. 154(b) by 505 days.

(21) Appl. No.: 16/495,470

(22) PCT Filed: Mar. 5, 2018

(86) PCT No.: PCT/JP2018/008335
§ 371 (c)(1),
(2) Date: Sep. 19, 2019

(87) PCT Pub. No.: WO2018/173720
PCT Pub. Date: Sep. 27, 2018

(65) Prior Publication Data
US 2020/0096616 A1 Mar. 26, 2020

(30) Foreign Application Priority Data
Mar. 24, 2017 (JP) .............................. JP2017-059893

(51) Int. Cl.
G01S 7/481 (2006.01)
G01S 7/03 (2006.01)
(Continued)

(52) U.S. Cl.
CPC .............. *G01S 7/4817* (2013.01); *G01S 7/03* (2013.01); *G01S 13/04* (2013.01); *G01S 17/04* (2020.01)

(58) Field of Classification Search
CPC ........ G01S 7/4817; G01S 13/04; G01S 13/06; G01S 17/04; G01S 17/06
See application file for complete search history.

(56) References Cited

U.S. PATENT DOCUMENTS 4,219,814 A * 8/1980 Johnson .................. G01S 13/88
266/86
5,751,408 A * 5/1998 Ohtomo .................. G01S 7/499
356/5.14

(Continued)

FOREIGN PATENT DOCUMENTS

EP 2 957 926 A1 12/2015
JP 2004-163271 A 6/2004
(Continued)

Primary Examiner — Peter M Bythrow
(74) Attorney, Agent, or Firm — Studebaker & Brackett PC

(57) ABSTRACT

An electromagnetic wave detection apparatus (10) includes an irradiator (11), a first detector (17), a propagation unit (20), a memory (13), and a controller (14). The irradiator (11) irradiates electromagnetic waves. The first detector (17) detects reflected waves of the electromagnetic waves irradiated onto an object (ob). The propagation unit (20) includes propagation elements (px). By irradiation position of the electromagnetic waves irradiated onto the object (ob), the propagation elements (px) switch between propagating and not propagating the reflected waves towards the first detector (17). The memory (13) stores information related to the emission direction of the electromagnetic waves. The controller (14) updates the information related to the emission direction based on the position of the propagation element (px) that is propagating the reflected waves toward (Continued)

the first detector (17) when the first detector (17) detects the reflected waves.

14 Claims, 13 Drawing Sheets

(51) Int. Cl.
*G01S 17/04* (2020.01)
*G01S 13/04* (2006.01)

(56) References Cited

U.S. PATENT DOCUMENTS

| | | | | |
|---|---|---|---|---|
| 5,760,886 | A * | 6/1998 | Miyazaki | G01B 11/026 |
| | | | | 180/169 |
| 7,075,315 | B2 * | 7/2006 | Tanaka | G01N 33/383 |
| | | | | 324/642 |
| 7,248,344 | B2 * | 7/2007 | Morcom | G01S 17/26 |
| | | | | 356/10 |
| 9,435,891 | B2 | 9/2016 | Oggier | |
| 2005/0104603 | A1 * | 5/2005 | Peschmann | G01R 27/06 |
| | | | | 324/637 |
| 2011/0176146 | A1 * | 7/2011 | Alvarez Diez | G01S 7/4817 |
| | | | | 356/601 |
| 2012/0249999 | A1 * | 10/2012 | Stettner | G01S 17/93 |
| | | | | 356/5.01 |
| 2013/0235365 | A1 * | 9/2013 | Marra | G01C 3/08 |
| | | | | 356/5.01 |
| 2014/0049783 | A1 * | 2/2014 | Royo Royo | G01S 7/4817 |
| | | | | 250/208.2 |
| 2014/0055771 | A1 * | 2/2014 | Oggier | G01S 17/894 |
| | | | | 356/5.01 |
| 2014/0327567 | A1 * | 11/2014 | Kishigami | G08G 1/056 |
| | | | | 342/146 |
| 2014/0340259 | A1 * | 11/2014 | Feh | G01F 23/284 |
| | | | | 342/359 |
| 2015/0051496 | A1 * | 2/2015 | Ouchi | A61B 5/0062 |
| | | | | 600/473 |
| 2015/0309167 | A1 * | 10/2015 | Shikatani | G01S 13/18 |
| | | | | 342/27 |
| 2015/0378023 | A1 * | 12/2015 | Royo Royo | G01S 17/89 |
| | | | | 356/5.01 |
| 2017/0102260 | A1 * | 4/2017 | Welle | G01F 17/00 |
| 2017/0141453 | A1 * | 5/2017 | Waelde | G01S 13/88 |
| 2017/0141454 | A1 * | 5/2017 | Welle | H01Q 21/065 |
| 2019/0008429 | A1 * | 1/2019 | Yamamoto | A61B 5/4875 |

FOREIGN PATENT DOCUMENTS

| | | |
|---|---|---|
| JP | 2010-096574 A | 4/2010 |
| JP | 2011-220732 A | 11/2011 |
| JP | 2015-513825 A | 5/2015 |

* cited by examiner

*FIG. 3*

First related information

| Signal value of drive signal | Emission direction |
|---|---|
| 000·······000 | $(\theta_0, \phi_0)$ |
| 000·······001 | $(\theta_0, \phi_1)$ |
| 000·······010 | $(\theta_1, \phi_1)$ |
| 000·······011 | $(\theta_1, \phi_2)$ |
| ⋮ | ⋮ |

FIG. 4

Second related information

| Emission direction | Position of pixel |
|---|---|
| $(\theta_0, \phi_0)$ | $(x'_0, y'_0)$ |
| $(\theta_0, \phi_1)$ | $(x'_0, y'_1)$ |
| $(\theta_1, \phi_1)$ | $(x'_1, y'_1)$ |
| $(\theta_1, \phi_2)$ | $(x'_1, y'_2)$ |
| ⋮ | ⋮ |

FIG. 5

Third related information

| Emission direction | Irradiation position |
|---|---|
| $(\theta_0, \phi_0)$ | $(x''_0, y''_0)$ |
| $(\theta_0, \phi_1)$ | $(x''_0, y''_1)$ |
| $(\theta_1, \phi_1)$ | $(x''_1, y''_1)$ |
| $(\theta_1, \phi_2)$ | $(x''_1, y''_2)$ |
| ⋮ | ⋮ |

ELECTROMAGNETIC WAVE DETECTION APPARATUS, PROGRAM, AND ELECTROMAGNETIC WAVE DETECTION SYSTEM

CROSS-REFERENCE TO RELATED APPLICATION

The present application claims priority to and the benefit of Japanese Patent Application No. 2017-059893 filed Mar. 24, 2017, the entire contents of which are incorporated herein by reference.

TECHNICAL FIELD

The present disclosure relates to an electromagnetic wave detection apparatus, a program, and an electromagnetic wave detection system.

BACKGROUND

In recent years, apparatuses have been developed to acquire information related to the surroundings from the results of detecting reflected waves of emitted electromagnetic waves. For example, an apparatus that uses laser radar to measure the position of an object is known, as in patent literature (PTL) 1.

CITATION LIST

Patent Literature

PTL 1: JP2011-220732A

SUMMARY

An electromagnetic wave detection apparatus according to a first aspect includes:
an irradiator configured to emit electromagnetic waves;
a first detector configured to detect reflected waves of the electromagnetic waves irradiated onto an object;
a propagation unit comprising a plurality of propagation elements that, by irradiation position of the electromagnetic waves irradiated onto the object, switch between propagating and not propagating the reflected waves towards the first detector;
a memory configured to store information related to an emission direction of the electromagnetic waves; and
a controller configured to update the information related to the emission direction based on a position of a propagation element that is propagating the reflected waves towards the first detector when the first detector detects the reflected waves.

An electromagnetic wave detection system according to a second aspect includes:
an irradiator configured to emit electromagnetic waves;
a first detector configured to detect reflected waves of the electromagnetic waves irradiated onto an object;
a propagation unit comprising a plurality of propagation elements that, by irradiation position of the electromagnetic waves irradiated onto the object, switch between propagating and not propagating the reflected waves towards the first detector;
a memory configured to store information related to an emission direction of the electromagnetic waves; and
a controller configured to update the information related to the emission direction based on a position of a propagation element that is propagating the reflected waves towards the first detector when the first detector detects the reflected waves.

A program according to a third aspect of the present disclosure is for causing an apparatus to execute steps including:
emitting electromagnetic waves;
detecting, using a first detector, reflected waves of the electromagnetic waves irradiated onto an object;
causing a portion of a plurality of propagation elements, configured to switch between propagating and not propagating the reflected waves towards the first detector, to propagate the reflected waves towards the first detector by irradiation position of the electromagnetic waves irradiated onto the object;
storing information related to an emission direction of the electromagnetic waves; and
updating the information related to the emission direction based on a position of a propagation element that is propagating the reflected waves towards the first detector when the first detector detects the reflected waves.

BRIEF DESCRIPTION OF THE DRAWINGS

In the accompanying drawings:

FIG. 3 illustrates an example of first related information stored in the memory of FIG. 1;

FIG. 4 illustrates an example of second related information stored in the memory of FIG. 1;

FIG. 5 illustrates an example of third related information stored in the memory of FIG. 1;

DETAILED DESCRIPTION

Embodiments of an electromagnetic wave detection apparatus to which the present disclosure is applied are described below with reference to the drawings. When the emission direction of emitted electromagnetic waves is estimated from previously obtained information, the actual emission direction and the estimated emission direction may differ. Therefore, an electromagnetic wave detection apparatus to which the present disclosure is applied is configured to reduce the difference between the actual emission direction of electromagnetic waves and the estimated emission direction of electromagnetic waves.

Figure 1:
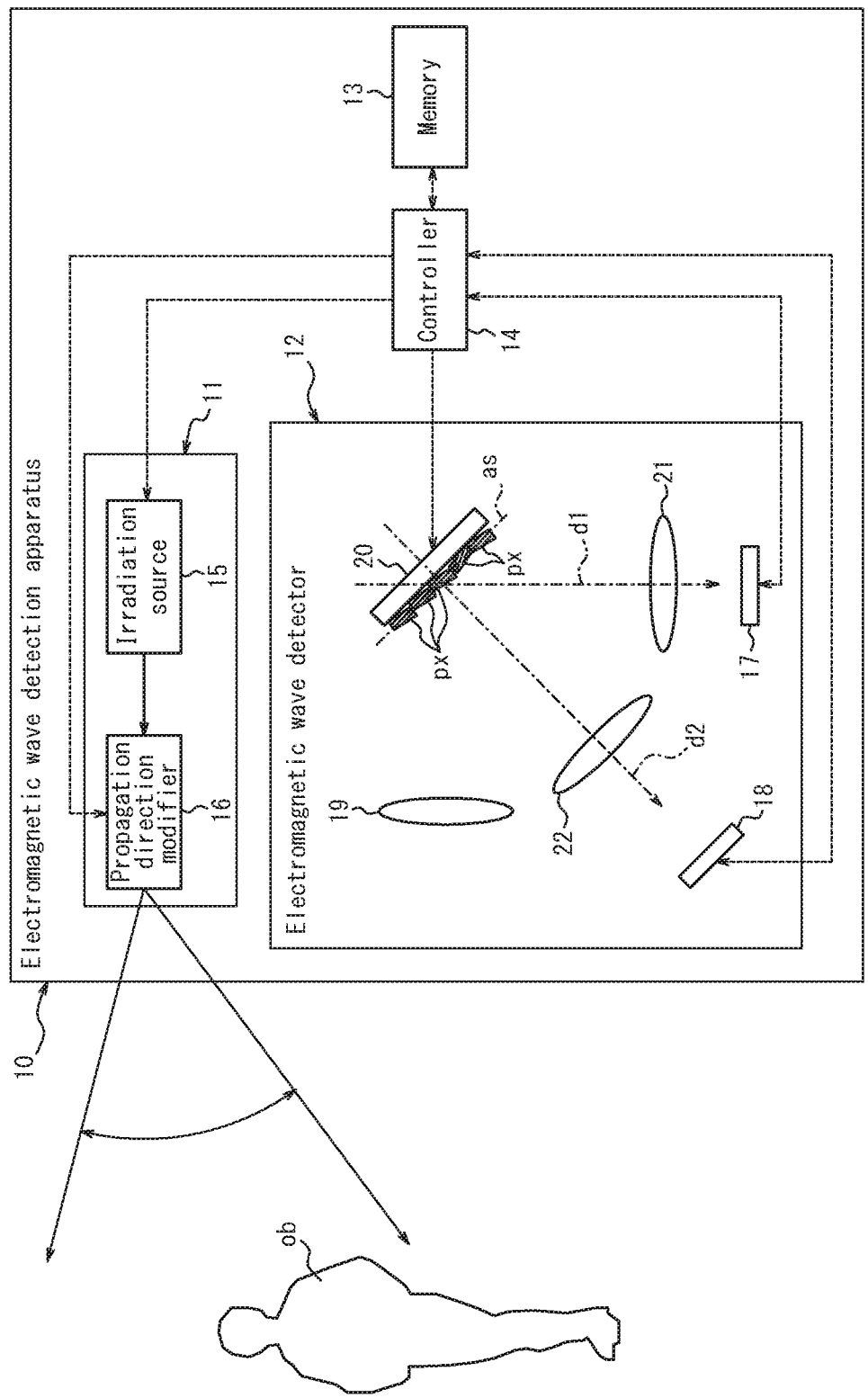
FIG. 1 is a configuration diagram schematically illustrating an electromagnetic wave detection apparatus according to a first embodiment.

As illustrated in FIG. 1, an electromagnetic wave detection apparatus 10 according to a first embodiment of the present disclosure includes an irradiator 11, an electromagnetic wave detector 12, a memory 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The irradiator 11 includes an irradiation source 15 that emits at least electromagnetic waves. The irradiation source 15 emits electromagnetic waves that, for example, are at least one of infrared rays, visible light rays, ultraviolet rays, and radio waves. In the first embodiment, the irradiation source 15 emits infrared rays.

The irradiation source 15 irradiates electromagnetic waves in a beam with a predetermined width. In the first embodiment, the irradiation source 15 emits a narrow beam, for example 0.5°, of electromagnetic waves. The irradiation source 15 can emit electromagnetic waves in pulses or continuously. In the first embodiment, the irradiation source 15 emits pulses of electromagnetic waves. For example, the irradiation source 15 includes a light emitting diode (LED), laser diode (LD), or the like. The irradiation source 15 switches between emitting and not emitting electromagnetic waves in response to control by the controller 14, described below.

In the irradiator 11, the emission direction of the electromagnetic waves may be fixed or may be variable in response to a control signal outputted from the controller 14. In the first embodiment, the emission direction of electromagnetic waves is variable.

The emission direction of electromagnetic waves may be changed by causing electromagnetic waves emitted from a single irradiation source 15 to be reflected by a reflecting surface with a variable inclination angle. The emission direction of electromagnetic waves may be changed as in phased array radar, for example, by emission of electromagnetic waves from a plurality of irradiation sources 15, disposed in an array on a flat surface, while the phase is shifted little by little. In the first embodiment, the emission direction of the electromagnetic waves is changed by reflection using a reflecting surface, as described below.

As described above, the irradiator 11 in the first embodiment further includes a propagation direction modifier 16.

The propagation direction modifier 16 includes a reflecting surface capable of changing orientation. The propagation direction modifier 16 changes the orientation of the reflecting surface based on a drive signal outputted by the controller 14, described below.

In accordance with the drive signal, the reflecting surface changes the propagation direction of the electromagnetic waves emitted from the irradiation source 15, thereby irradiating an object ob while changing the irradiation position. In other words, the propagation direction modifier 16 scans the object ob with the electromagnetic waves emitted from the irradiation source 15. The propagation direction modifier 16 scans the object ob in one or two dimensions. In the first embodiment, the propagation direction modifier 16 scans the object ob in two dimensions.

The propagation direction modifier 16 is configured so that at least a portion of an irradiation region of the electromagnetic waves that are emitted by the irradiation source 15 and reflected is included in an electromagnetic wave detection range of the electromagnetic wave detection apparatus 10. Accordingly, at least a portion of the electromagnetic waves irradiated onto the object ob via the propagation direction modifier 16 can be detected by the electromagnetic wave detection apparatus 10.

In the first embodiment, the propagation direction modifier 16 is configured so that at least a portion of the irradiation region of the electromagnetic waves that are emitted by the irradiation source 15 and reflected by the propagation direction modifier 16 is included in the detection range of a second detector 18 and a first detector 17. Accordingly, at least a portion of the electromagnetic waves irradiated onto the object ob via the propagation direction modifier 16 can be detected by the second detector 18 and the first detector 17.

The propagation direction modifier 16 may, for example, include a micro electro mechanical systems (MEMS) mirror, a polygon mirror, a galvano mirror, or the like. In the first embodiment, the propagation direction modifier 16 includes a MEMS mirror.

The electromagnetic wave detector 12 includes a pre-stage optical system 19, a propagation unit 20, a first post-stage optical system 21, a second post-stage optical system 22, the second detector 18, and the first detector 17.

The pre-stage optical system 19 includes either or both of a lens and a mirror, for example, and forms an image of the object ob that is located in the irradiation region of electromagnetic waves and becomes a subject of imaging.

It suffices for the propagation unit 20 to be provided at or near a primary image formation position, which is the position where the image of the object ob located at a predetermined position separate from the pre-stage optical system 19 is formed by the pre-stage optical system 19. In the first embodiment, the propagation unit 20 is provided at the primary image formation position.

The propagation unit 20 has an action surface "as" on which electromagnetic waves that pass through the pre-stage optical system 19 are incident. The action surface as is formed by a plurality of pixels (propagation elements) px aligned in a two-dimensional pattern. The action surface as is a surface that, in at least one of the first state and the second state described below, produces effects on the electromagnetic waves such as reflection and transmission.

By irradiation position of electromagnetic waves irradiated onto the object ob, the pixels px are capable of switching between propagating and not propagating reflected waves of the electromagnetic waves towards the second detector 18. Furthermore, the propagation unit 20 can switch each pixel px between a first state of propagating the electromagnetic waves incident on the action surface as in a first direction d1 and a second state of propagating the electromagnetic waves in a second direction d2. In the first embodiment, the first state is a first reflecting state of reflecting the electromagnetic waves incident on the action surface as in the first direction d1. The second state is a second reflecting state of reflecting the electromagnetic waves incident on the action surface as in the second direction d2.

In greater detail, the propagation unit 20 of the first embodiment includes a reflecting surface that reflects the electromagnetic waves on each pixel px. The propagation unit 20 switches each pixel px between the first state and the second state by changing the orientation of the reflecting surface of each pixel px.

In the first embodiment, the propagation unit 20 includes a digital micro mirror device (DMD), for example. The DMD can drive minute reflecting surfaces that configure the action surface as to switch the reflecting surface on each pixel px between inclined states of +12° and −12° relative to the action surface as. The action surface as is parallel to the board surface of a substrate on which the minute reflecting surfaces are mounted in the DMD.

Figure 2:
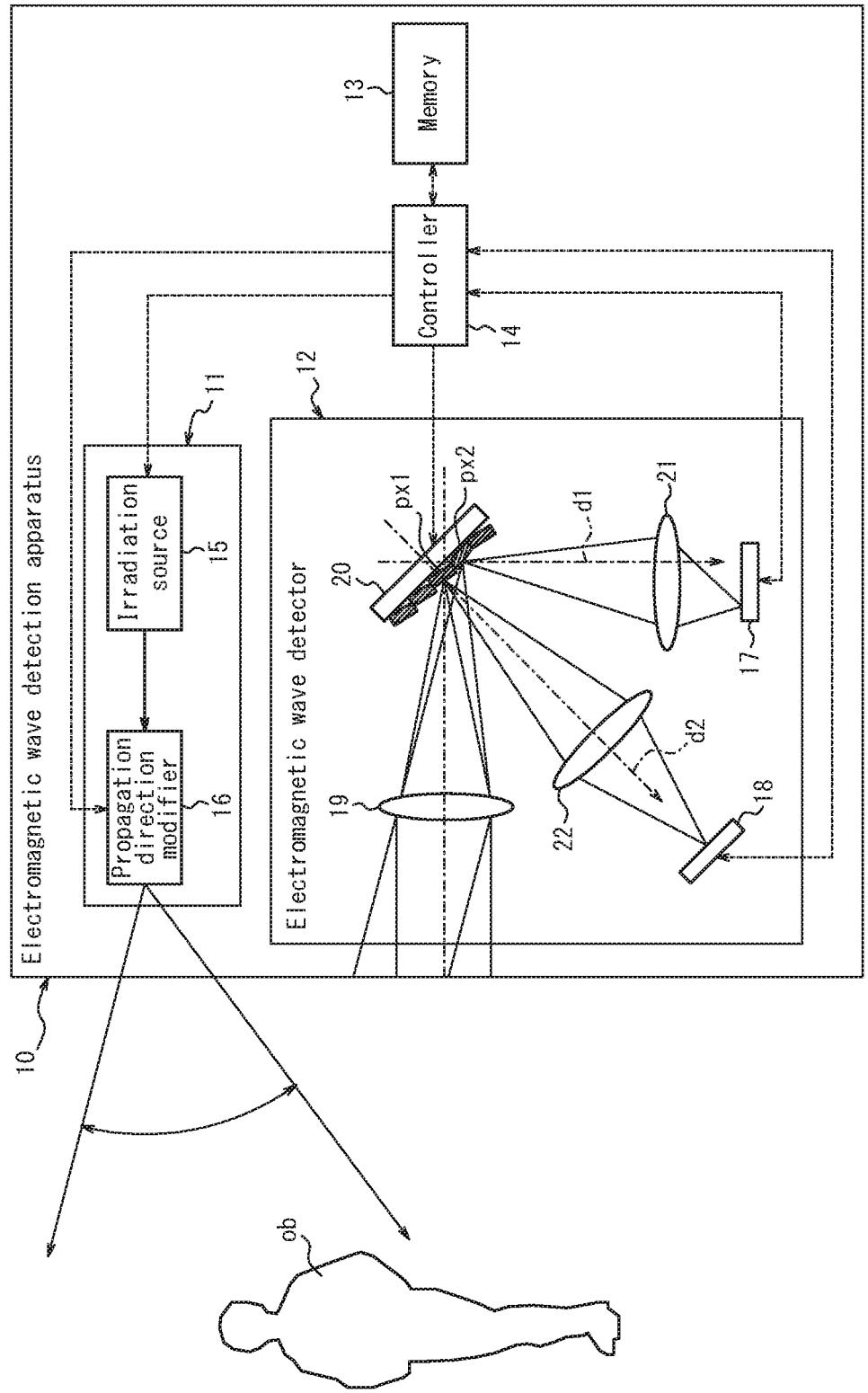
FIG. 2 is a configuration diagram of the electromagnetic wave detection apparatus to illustrate the propagation direction of electromagnetic waves in a first state and a second state of pixels in a propagation unit of the electromagnetic wave detection apparatus of FIG. 1.

The propagation unit 20 switches each pixel px between the first state and the second state in response to control by the controller 14, described below. For example, as illustrated in FIG. 2, the propagation unit 20 can simultaneously propagate electromagnetic waves incident on a portion of pixels px1 in the first direction d1 by switching the pixels px1 to the first state and propagate electromagnetic waves incident on another portion of pixels px2 in the second direction d2 by switching the pixels px2 to the second state. The propagation unit 20 can also propagate the electromagnetic waves incident on the same pixel px in the second direction d2 after the first direction d1 by switching the pixel px from the first state to the second state.

In the second state, each pixel px of the propagation unit 20 propagates the reflected waves of electromagnetic waves irradiated onto the object ob towards different detection elements of the second detector 18, described below, by irradiation position.

As illustrated in FIG. 1, the first post-stage optical system 21 is provided in the first direction d1 from the propagation unit 20. The first post-stage optical system 21 includes either or both of a lens and a mirror, for example. The first post-stage optical system 21 forms an image of the object ob represented by the electromagnetic waves whose propagation direction is switched at the propagation unit 20.

The second post-stage optical system 22 is provided in the second direction d2 from the propagation unit 20. The second post-stage optical system 22 includes either or both of a lens and a mirror, for example. The second post-stage optical system 22 forms an image of the object ob represented by the electromagnetic waves whose propagation direction is switched at the propagation unit 20.

The first detector 17 is provided along the path of electromagnetic waves that propagate through the first post-stage optical system 21 after propagating in the first direction d1 due to the propagation unit 20. The first detector 17 detects electromagnetic waves that pass through the first post-stage optical system 21, i.e. electromagnetic waves that propagate in the first direction d1.

In the first embodiment, the first detector 17 is an active sensor that detects reflected waves, from the object ob, of electromagnetic waves irradiated towards the object ob from the irradiator 11. The first detector 17 in the first embodiment detects reflected waves, from the object ob, of electromagnetic waves irradiated towards the object ob after being irradiated from the irradiator 11 and reflected by the propagation direction modifier 16.

In greater detail, the first detector 17 of the first embodiment includes a device configured as a ranging sensor. For example, the first detector 17 includes a single device such as an Avalanche PhotoDiode (APD), a PhotoDiode (PD), or a ranging image sensor. The first detector 17 may include a device array, such as an APD array, a PD array, a ranging imaging array, or a ranging image sensor.

The first detector 17 detects reflected waves from a subject. In greater detail, the first detector 17 in the first embodiment detects electromagnetic waves in the infrared light band. Accordingly, the first detector 17 in the first embodiment cooperates with the propagation direction modifier 16 to form a scanning-type ranging sensor. The first detector 17 transmits detection information, indicating the detection of reflected waves, to the controller 14 as a signal.

It suffices for the single device configured as the above-described ranging sensor in the first detector 17 to be capable of detecting electromagnetic waves. Image formation at the detection surface is not required. The first detector 17 therefore need not be provided at a secondary image formation position, which is a position of image formation by the first post-stage optical system 21. In other words, as long as electromagnetic waves from all angles of view can be incident on the detection surface, the first detector 17 with this configuration may be disposed at any position along the path of electromagnetic waves that propagate in the first direction d1, due to the propagation unit 20, and subsequently pass through the first post-stage optical system 21.

The second detector 18 is provided along the path of electromagnetic waves that propagate through the second post-stage optical system 22 after propagating in the second direction d2 due to the propagation unit 20. The second detector 18 detects electromagnetic waves that pass through the second post-stage optical system 22, i.e. electromagnetic waves that propagate in the second direction d2.

The second detector 18 is a passive sensor that includes a plurality of detection elements. The detection elements are arranged in a plane perpendicular to the optical axis of the first post-stage optical system 21. In greater detail, the second detector 18 in the first embodiment includes a device array. For example, the second detector 18 includes an imaging device such as an image sensor or an imaging array, captures the image formed from electromagnetic waves at a detection surface, and generates image information corresponding to the imaged object ob. In greater detail, the second detector 18 in the first embodiment captures a visible light image. The second detector 18 transmits the generated image information to the controller 14 as a signal.

The second detector 18 detects the reflected waves of the electromagnetic waves irradiated onto the object ob from the irradiation source 15 via the propagation direction modifier 16, captures an image formed by the detected electromagnetic waves, and generates image information corresponding to the captured object ob. The detection elements detect the electromagnetic waves by irradiation position on the object ob.

The second detector 18 may capture an image other than a visible light image. The second detector 18 may include a thermo sensor. In this configuration, the electromagnetic wave detection apparatus 10 can acquire temperature information with the second detector 18.

In this way, the second detector 18 in the first embodiment includes a device array. Therefore, when an image is formed on the detection surface by incident electromagnetic waves, the image formed by the electromagnetic waves is incident on each detection element of the second detector 18, allowing an improvement in resolution. The second detector 18 is therefore preferably provided at a secondary image formation position, which is a position of image formation by the second post-stage optical system 22.

The memory 13 may be configured by a semiconductor memory, a magnetic memory, or the like. The memory 13 stores a variety of information, data, programs for causing the electromagnetic wave detection apparatus 10 to operate, and the like. The memory 13 also functions as a working memory.

For example, the memory 13 stores information related to the emission direction of electromagnetic waves. The emission direction of electromagnetic waves refers to a variety of elements that define the emission direction. In a configuration adopting the propagation direction modifier 16, as in the first embodiment, the first related information may be the inclination angle of the reflecting surface relative to a reference surface. The inclination angle may refer to the inclination angle relative to one axis, or inclination angles relative to two axes. As described above, when a plurality of irradiation sources 15 disposed in an array on a flat surface emit electromagnetic waves while shifting the phase little by little, the first related information may be the position identifying the irradiation source 15, among the plurality of irradiation sources 15, that is emitting electromagnetic waves. As also described above, the first related information may be a direction vector in a space serving as a reference in the irradiator 11 when the emission direction is fixed.

In the first embodiment, the memory 13 stores first related information through third related information.

The first related information is information associating a drive signal and an emission direction of electromagnetic waves corresponding to the drive signal. The first related information is, for example, the relationship between the drive signal and the emission direction, i.e. a function indicating the correlation between the drive signal and the emission direction. The first related information may also be the relationship between the emission direction and the drive signal, i.e. a function indicating the correlation between the emission direction and the drive signal. The first related information may, for example, be the emission direction ($\theta$, $\phi$) associated individually with each of a plurality of signal values of the drive signal, as illustrated in FIG. 3. The first related information may also be a plurality of signal values of the drive signal associated individually with each emission direction.

The second related information is information associating an emission direction of electromagnetic waves and the position of the pixel px (propagation element) on which reflected waves of the electromagnetic waves emitted in the emission direction are incident. The second related information is, for example, the position of the pixel px as a function of the emission direction or the emission direction as a function of the position of the pixel px. The second related information may, for example, be the position (x', y') of the pixel px associated individually with each emission direction ($\theta$, $\phi$), as illustrated in FIG. 4. The second related information may also be the emission direction associated individually with the position of each pixel px.

The third related information is information associating an emission direction of electromagnetic waves and the irradiation position within the irradiation region of the electromagnetic waves emitted in the emission direction. The third related information is, for example, the irradiation position as a function of the emission direction or the emission direction as a function of the irradiation position. The third related information may, for example, be the irradiation position (x", y") associated individually with each emission direction ($\theta$, $\phi$), as illustrated in FIG. 5. The third related information may also be the emission direction associated individually with each irradiation position.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) and a system in a package (SiP) that have one processor or a plurality of processors working together.

The controller 14 acquires information related to the surroundings of the electromagnetic wave detection apparatus 10 based on electromagnetic waves detected by each of the second detector 18 and the first detector 17. The information related to the surroundings may, for example, be image information, distance information, and temperature information.

In the first embodiment, the controller 14 acquires image information in the form of electromagnetic waves detected as an image by the second detector 18, as described above. Based on the detection information detected by the first detector 17, the controller 14 in the first embodiment also uses the time-of-flight (TOF) method to acquire distance information of the irradiation position irradiated by the irradiator 11.

Figure 6:
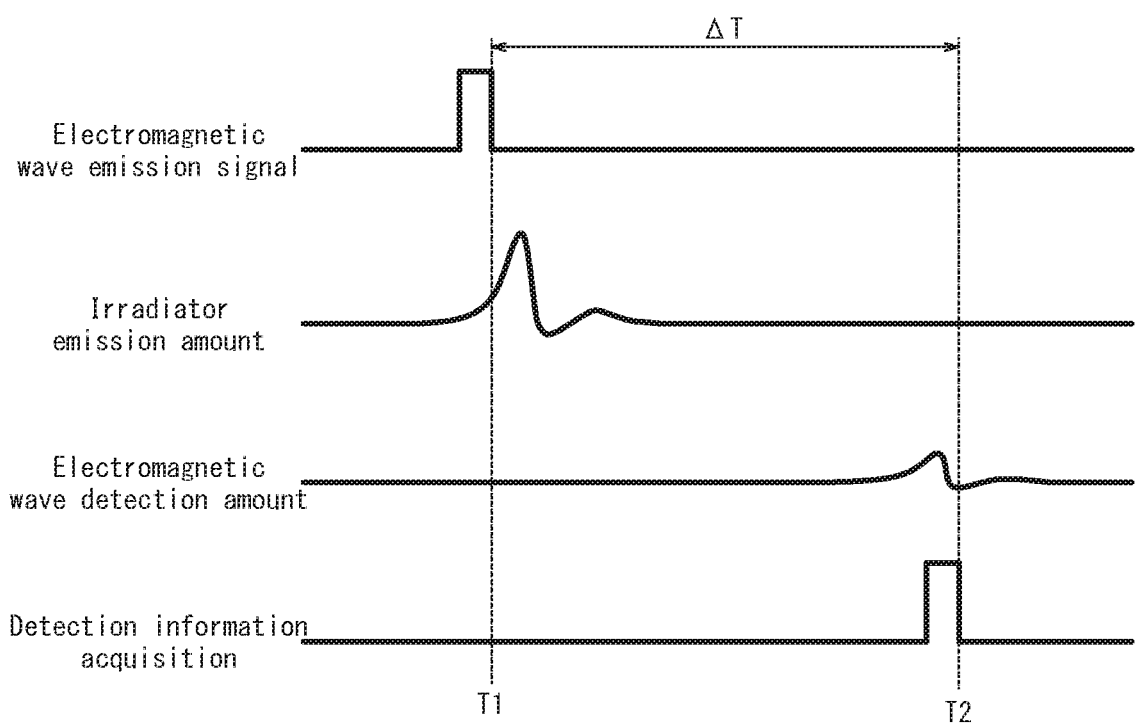
FIG. 6 is a timing chart of the timing of irradiation and detection of electromagnetic waves to illustrate the principle of ranging by a ranging sensor configured by an irradiator, a second detector, and a controller of FIG. 1.

As illustrated in FIG. 6, the controller 14 causes the irradiation source 15 to emit pulses of electromagnetic waves by inputting an electromagnetic wave emission signal to the irradiation source 15 (see the "electromagnetic wave emission signal" section). The irradiation source 15 irradiates electromagnetic waves based on the inputted electromagnetic wave emission signal (see the "irradiator emission amount" section). The electromagnetic waves emitted by the irradiation source 15 and reflected by the propagation direction modifier 16 to be irradiated onto an arbitrary irradiation region are reflected in the irradiation region.

The controller 14 may, for example, include a time measurement large scale integrated circuit (LSI) and measure a time $\Delta T$ from a timing T1 at which the controller 14 caused the irradiation source 15 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position.

The controller 14 outputs the drive signal to the propagation direction modifier 16. The controller 14 also reads the first related information and the third related information from the memory 13. The controller 14 calculates the irradiation position based on an outputted drive signal, the first related information, and the third related information. By calculating the distance to the irradiation position while changing the irradiation position using the drive signal, the controller 14 creates distance information in the image information acquired from the second detector 18.

In the first embodiment, the electromagnetic wave detection apparatus 10 is configured to create distance information by direct ToF, in which the time is directly measured from when laser light is irradiated until the laser light returns. The electromagnetic wave detection apparatus 10 is not, however, limited to this configuration. For example, the electromagnetic wave detection apparatus 10 may create distance information by flash ToF, in which electromagnetic waves are irradiated with a constant period, and the time until return is measured indirectly from the phase difference between the irradiated electromagnetic waves and the returning electromagnetic waves. The electromagnetic wave detection apparatus 10 may also create distance information by another ToF method, such as phased ToF.

The controller 14 controls the irradiation source 15, the propagation direction modifier 16, the propagation unit 20, the first detector 17, and the second detector 18 to repeatedly acquire the image information and the distance information. The control of each portion to repeatedly acquire the image information and the distance information is described below with reference to the timing chart in FIG. 7.

Figure 7:
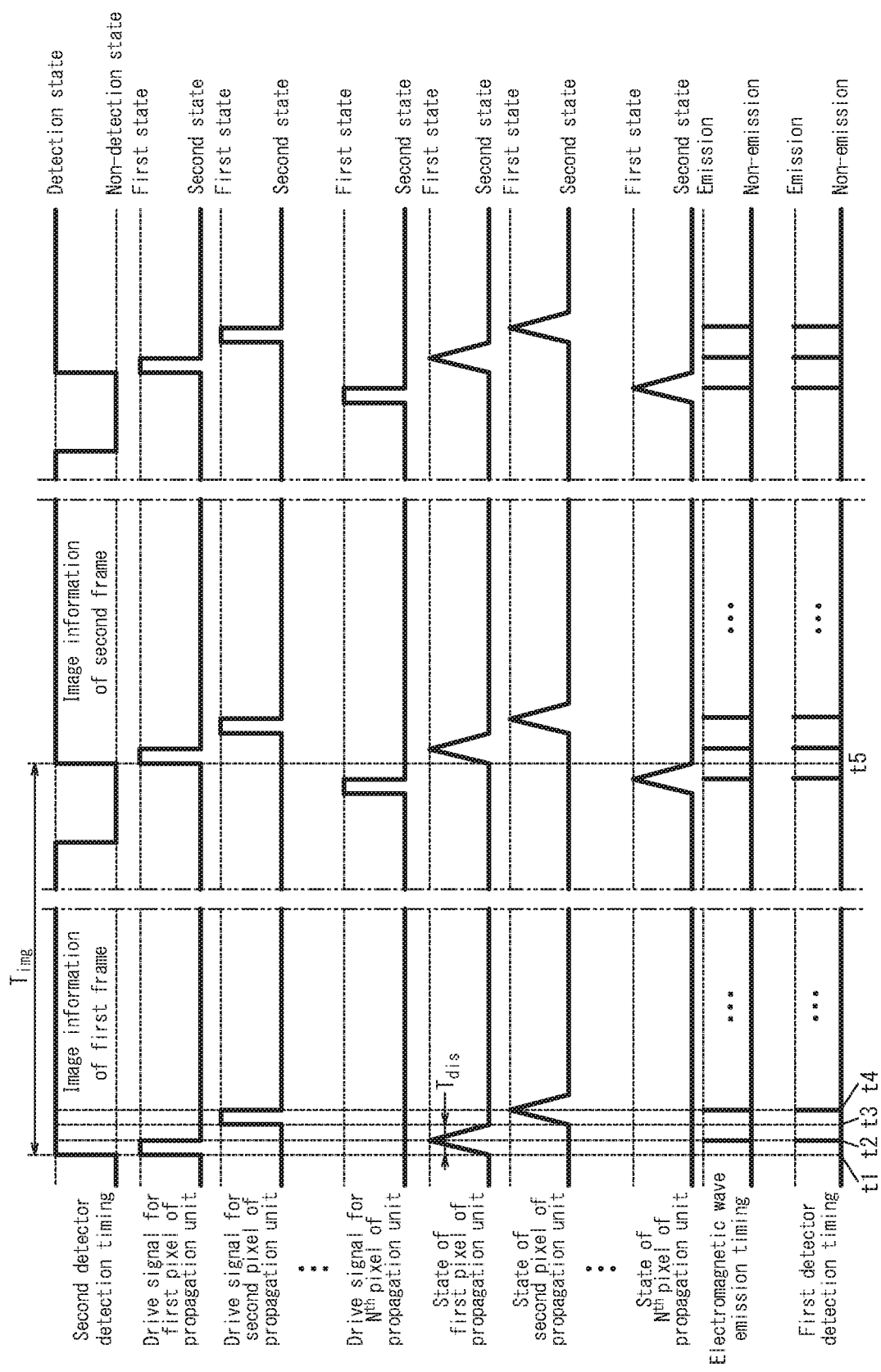
FIG. 7 is a timing chart to illustrate control of each portion for the controller of FIG. 1 to repeatedly acquire image information and distance information.
Figure 8:
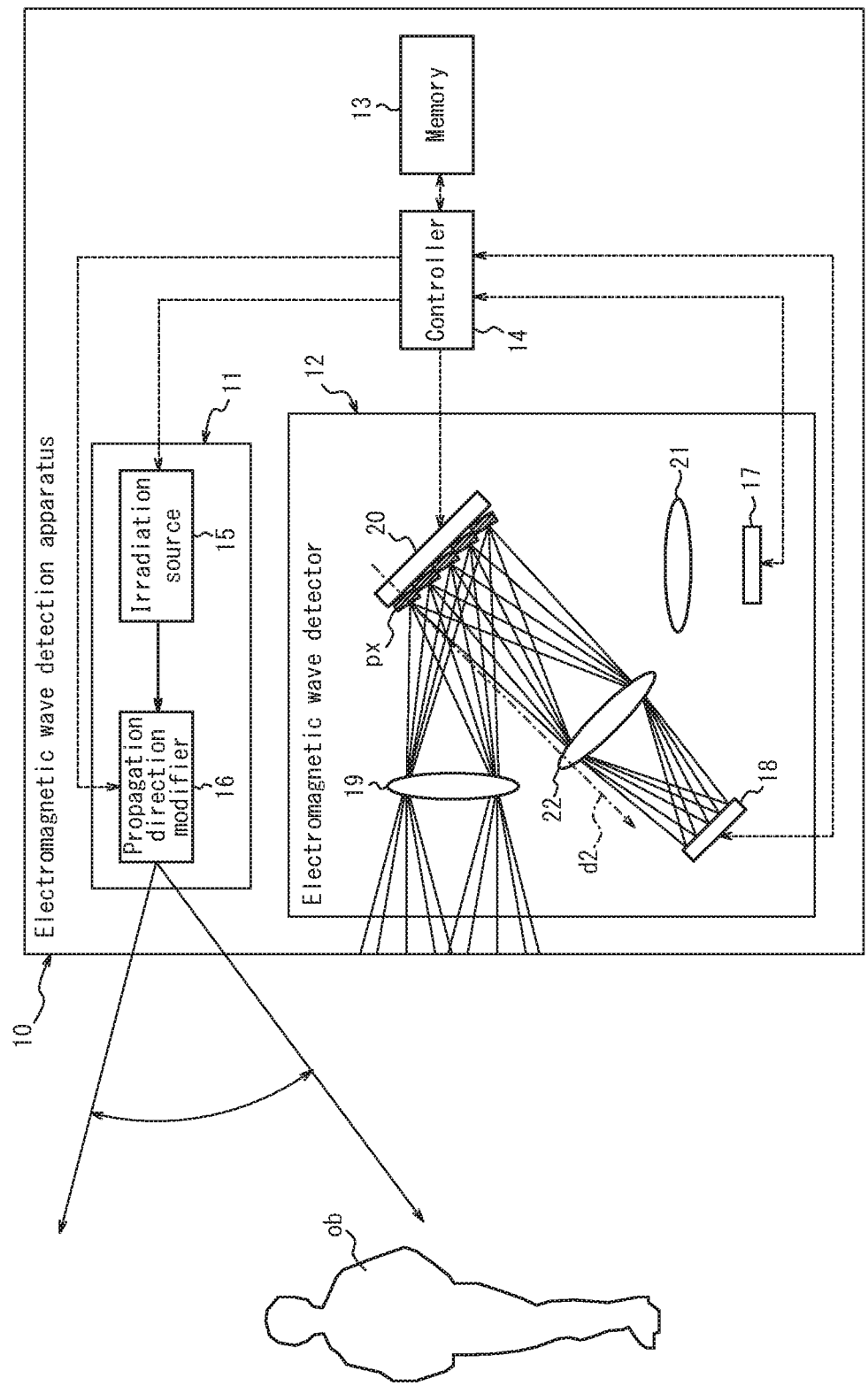
FIG. 8 is a configuration diagram of the electromagnetic wave detection apparatus to illustrate the propagation state of electromagnetic waves when an arbitrary pixel of the propagation unit of FIG. 1 is in the second state.

At timing t1, the controller 14 causes the second detector 18 to start detecting electromagnetic waves for generating image information of a first frame. At timing t1, all of the pixels px of the propagation unit 20 are in the second state, and the electromagnetic waves incident on the pre-stage optical system 19 reach the second detector 18 (see FIG. 8). At timing t1, the controller 14 also starts the switching of the first pixel px in the propagation unit 20 from the second state to the first state (see "drive signal for first pixel of propagation unit" section), as illustrated in FIG. 7. At timing t1, all of the other pixels px remain in the second state (see "state of second pixel of propagation unit", "state of $N^{th}$ pixel of propagation unit" sections).

Figure 9:
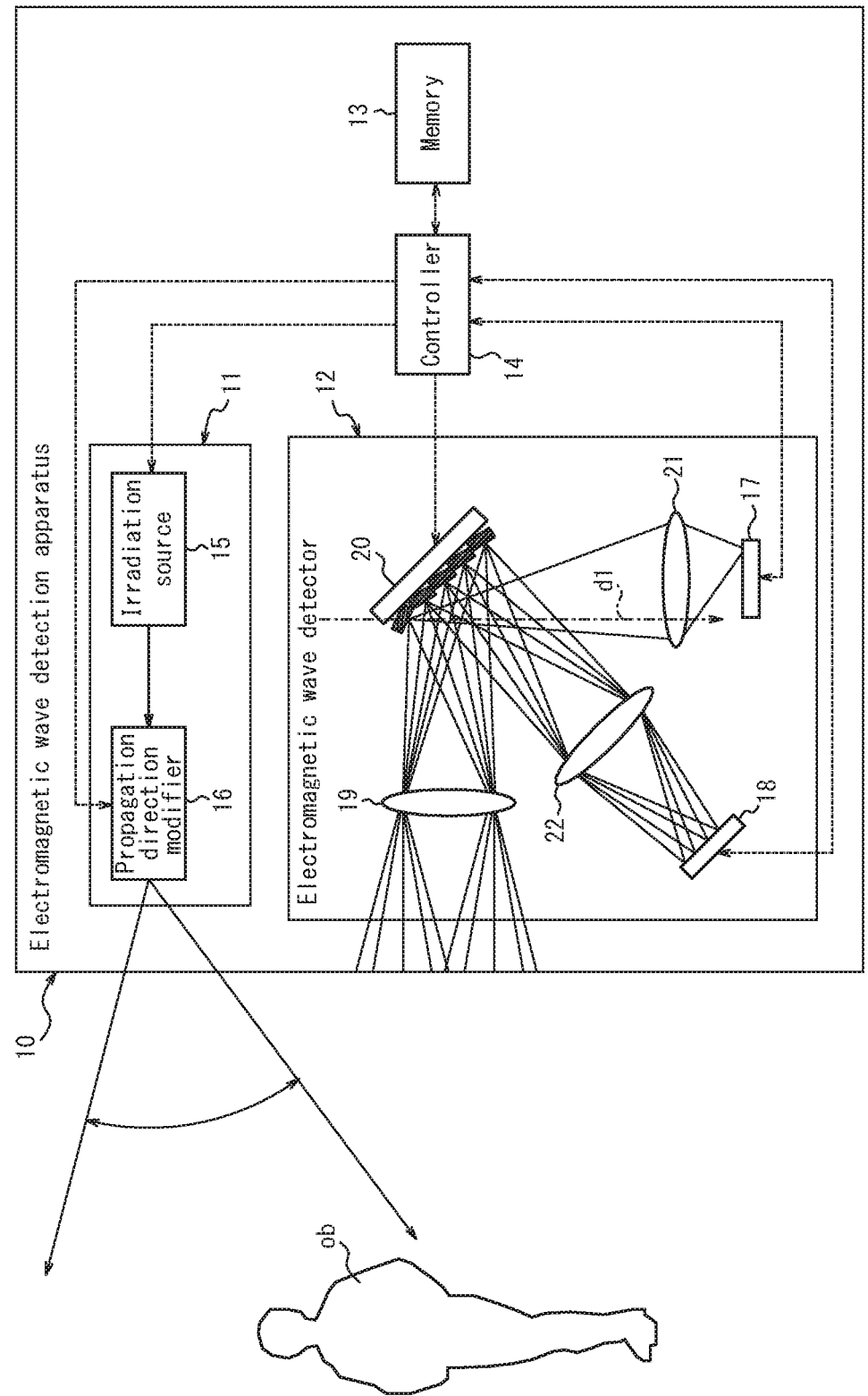
FIG. 9 is a configuration diagram of the electromagnetic wave detection apparatus to illustrate the propagation state of electromagnetic waves when only the arbitrary pixel of FIG. 8 is in the first state.

At timing t2, which is when switching of the first pixel px of the propagation unit 20 from the second state to the first state is complete (see "state of first pixel of propagation unit" section), the controller 14 causes the irradiation source 15 to emit electromagnetic waves (see "electromagnetic wave emission timing" section). At timing t2, the first pixel px of the propagation unit 20 switches from the second state (see FIG. 8) to the first state, and the electromagnetic waves that are incident on the pre-stage optical system 19 and form an image on the first pixel px of the propagation unit 20 propagate in the first direction d1 after the second direction d2 (see FIG. 9).

As illustrated in FIG. 7, the controller 14 causes the first detector 17 to detect electromagnetic waves at timing t2 (see "second detector detection timing" section). The time it takes from when the irradiation source 15 irradiates the electromagnetic waves until the electromagnetic waves reach the electromagnetic wave detection apparatus 10 is extremely short compared to the detection time for generating the image information and is, for example, on the order of nanoseconds. Therefore, detection of electromagnetic waves by the first detector 17 is complete in a negligible time and is considered to be the timing t2. The controller 14 acquires the distance information at the irradiation position corresponding to the first pixel px of the propagation unit 20 by calculation based on the drive signal transmitted to the propagation direction modifier 16 at timing t2.

Furthermore, at timing t2, the controller 14 starts the switching of the first pixel px in the propagation unit 20 from the first state to the second state (see "drive signal for first pixel of propagation unit" section). In this way, the controller 14 switches the first pixel px in the propagation unit 20 from the first state to the second state and can thereby cause the detection element in the second detector 18 corresponding to the first pixel px to detect the electromagnetic waves (visible light) again.

At timing t3, which is when switching of the first pixel px of the propagation unit 20 from the first state to the second state is complete (see "state of first pixel of propagation unit" section), the controller 14 starts the switching of the second pixel px in the propagation unit 20 from the second state to the first state (see "drive signal for second pixel of propagation unit" section). At timing t3, all of the other pixels px remain in the second state (see "state of first pixel of propagation unit", "state of $N^{th}$ pixel of propagation unit" sections).

At timing t4, which is when switching of the second pixel px of the propagation unit 20 from the second state to the first state is complete (see "state of second pixel of propagation unit" section), the controller 14 causes the irradiation source 15 to emit electromagnetic waves (see "electromagnetic wave emission timing" section). At timing t4, the second pixel px of the propagation unit 20 switches from the second state to the first state, and the electromagnetic waves that are incident on the pre-stage optical system 19 and form an image on the second pixel px of the propagation unit 20 propagate in the first direction d1 after the second direction d2. The controller 14 causes the first detector 17 to detect electromagnetic waves at timing t4 (see "second detector detection timing" section). The controller 14 acquires the distance information at the irradiation position corresponding to the second pixel px of the propagation unit 20 by calculation based on the drive signal transmitted to the propagation direction modifier 16 at timing t4.

Furthermore, at timing t4, the controller 14 starts the switching of the first pixel px in the propagation unit 20 from the first state to the second state (see "drive signal for second pixel of propagation unit" section). In this way, the controller 14 switches the second pixel px in the propagation unit 20 from the first state to the second state and can thereby cause the detection element in the second detector 18 corresponding to the second pixel px to detect the electromagnetic waves (visible light) again.

The controller 14 subsequently switches the third pixel px to the $N^{th}$ pixel px in the propagation unit 20 in order, in the same way as the first pixel px, from the second state to the first state and from the first state to the second state. The controller 14 thereby acquires image information of the first frame along with distance information at the irradiation position corresponding to each pixel px.

As described above, the controller 14 is configured to perform control to start switching of the $M^{th}$ pixel px from the second state to the first state at the timing at which switching of the $(M-1)^{th}$ pixel px from the first state to the second state is complete. In this configuration, the propagation unit 20 can switch $T_{img}/T_{dis}$ pixels px from the second state to the first state in a time $T_{img}$ for generating one frame of image information.

In other words, the controller 14 can generate distance information for $T_{img}/T_{dis}$ pixels px in the time $T_{img}$. M is an integer satisfying $2 \leq M \leq N$. $T_{dis}$ is the sum of the time required for switching a pixel px of the propagation unit 20 from the second state to the first state and the time required to return from the first state to the second state. In other words, $T_{dis}$ is the time required to switch an arbitrary pixel px in order from the second state to the first state and back to the second state. In the first embodiment, $T_{img}$ is 1/60 s, for example, and $T_{dis}$ is 1/3000 s.

In a configuration in which the value of $T_{img}/T_{dis}$ is less than the number of pixels in the propagation unit 20, the controller 14 cannot switch all of the pixels px in the propagation unit 20 during the time $T_{img}$. Therefore, during the generation of one frame of image information, the controller 14 cannot generate distance information corresponding to the frame of image information. In other words, during the generation of one frame of image information, the controller 14 can only generate distance information corresponding to less than the frame of image information (for example, 0.5 frames).

To address this issue in a configuration in which the value of $T_{img}/T_{dis}$ is less than the number of pixels in the propagation unit 20, the controller 14 selects a smaller number of pixels px than $T_{img}/T_{dis}$ as targets of switching from among all of the pixels px in the propagation unit 20. Furthermore, the controller 14 transmits a drive signal to the propagation direction modifier 16 so that, at the timing of switching to the first state for each pixel px selected as a target of switching, electromagnetic waves are irradiated onto a region corresponding to the pixel px within the irradiation region.

In a configuration in which the value of $T_{img}/T_{dis}$ is less than the number of pixels in the propagation unit 20, the controller 14 may also perform control so that switching of all pixels px in the propagation unit 20 is complete during a time $P \times T_{img}$ for generating the image information of a plurality of frames (P frames, where P is a positive number satisfying P>1). Furthermore, the controller 14 transmits a drive signal to the propagation direction modifier 16 so that, at the timing of switching of each pixel px of the propagation unit 20, electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and collectively switch pixels px group by group. Furthermore, the controller 14 may transmit a drive signal to the propagation direction modifier 16 so that, at the timing of switching of a pixel px at a position representative of each group (for example, the central position of each group), electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and switch only a certain pixel px in each group. Furthermore, the controller 14 may transmit a drive signal to the propagation direction modifier 16 so that, at the timing of switching of the certain pixel px, electromagnetic waves are irradiated onto a region corresponding to the pixel px within the irradiation region.

The detection element in the second detector 18 corresponding to a pixel px, of the propagation unit 20, switched to the first state during the capturing time of an image of one frame cannot receive light while the pixel px is in the first state. Therefore, the signal strength dependent on this detection element in the second detector 18 is reduced. The controller 14 may compensate for the reduced signal strength by multiplying the signal value of the detection element in the second detector 18 by a gain. The capturing time of an image of one frame corresponds to the time when the second detector 18 detects electromagnetic waves for generating one frame of image information.

In a configuration in which the scanning rate by the propagation direction modifier 16 is faster than the switching rate of a pixel px, i.e. when $T_{scn}$ is shorter than $T_{dis}$, the controller 14 may start switching of the $M^{th}$ pixel px from the second state to the first state before the timing at which switching of the $(M-1)^{th}$ pixel px from the second state to the first state is complete.

$T_{scn}$ is the time required for the irradiation position of electromagnetic waves emitted from the irradiation source 15 and reflected by the propagation direction modifier 16 to change from a certain irradiation position to the next irradiation position, or the time required to change from a certain irradiation position to an adjacent irradiation position. In this configuration, distance information can be generated at more pixels px in a shorter time than when another pixel px is switched to the first state only after switching of an arbitrary pixel px from the first state to the second state is complete.

The controller 14 starts detection of electromagnetic waves for generating image information of a second frame at t5, which is when the time $T_{img}$ required to generate image information of the first frame has elapsed from timing t1 (see "first detector detection timing" section). After detection of electromagnetic waves by the second detector 18 from timing t1 to t5 is finished, the controller 14 acquires the image information of the first frame based on the electromagnetic waves detected during that time. Subsequently, the controller 14 controls the irradiation source 15, the propagation direction modifier 16, the first detector 17, the second detector 18, and the propagation unit 20 to acquire the image information and the distance information in the same way as the control from timing t1 to t5.

The controller 14 updates the information related to the emission direction based on the position of the propagation element, in the propagation unit 20, that is propagating the reflected waves towards the first detector 17 when the first detector 17 detects the reflected waves. In the first embodiment, the controller 14 updates the information related to the emission direction by updating the first related information. In a configuration with a fixed emission direction, as described above, it suffices for the controller 14 to update the emission direction. Details on the updating of the first related information in the first embodiment are provided below.

Figure 10:
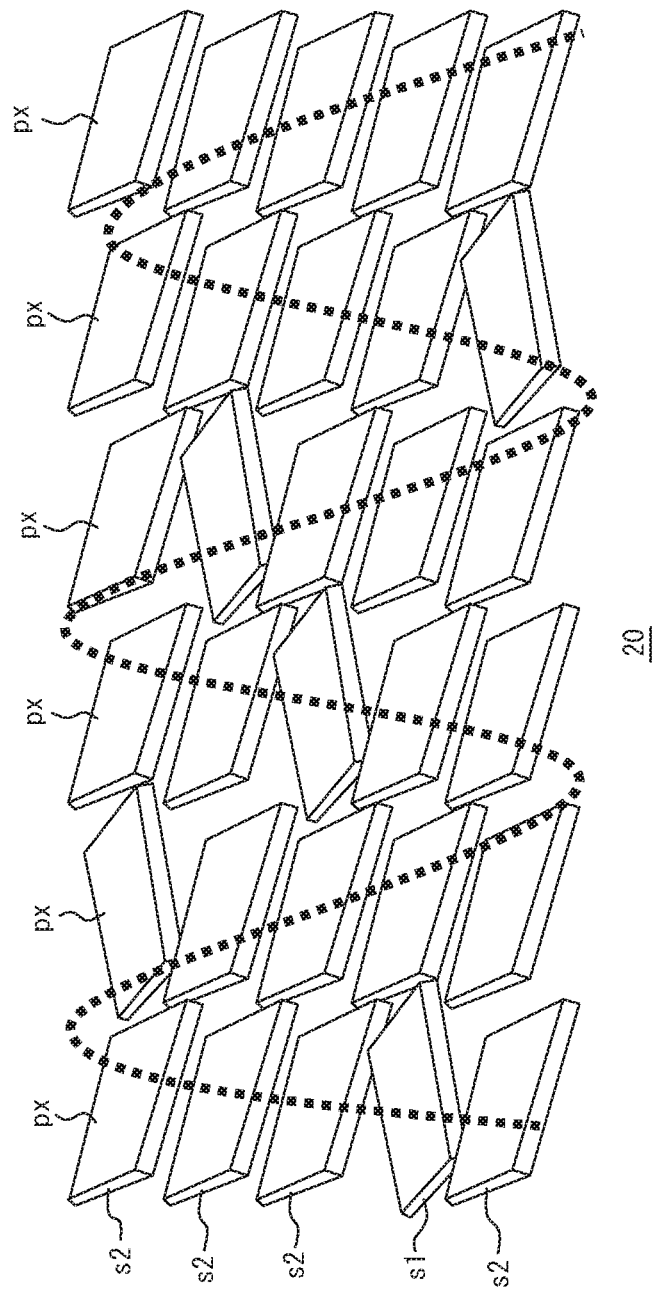
FIG. 10 is a schematic diagram of the propagation unit in the electromagnetic wave detection apparatus of the first embodiment, illustrating the state of pixels in the propagation unit and the scanning trajectory of reflected waves when the first related information is updated.

As illustrated in FIG. 10, to update the information related to the emission direction, the controller 14 switches pixels px at predetermined positions in the propagation unit 20 to the first state (see reference sign "s1") and switches the other pixels px to the second state (see reference sign "s2"). The propagation unit 20 is configured by 30 pixels px in 5 rows and 6 columns in FIG. 10 to simplify the drawing, but the number of pixels px is not limited to 30.

At least one pixel px at a predetermined position is sufficient when the first related information is configured to be the emission direction as a function of the drive signal, or the drive signal as a function of the emission direction. A plurality of pixels px at predetermined positions is used when the first related information is configured to be the emission direction associated individually with each of a plurality of signal values of the drive signal, or a plurality of signal values of the drive signal associated individually with each emission direction. As the number of pixels px at predetermined positions increases, the updating becomes more accurate. In a configuration with a plurality of pixels px at predetermined positions, the plurality of pixels px may be separated from each other. For example, the plurality of pixels px may be separated from each other at least by intervals of a predetermined number of pixels.

The controller 14 transmits a drive signal, whose signal value is a function of the elapsed time from a reference time, to the propagation direction modifier 16. The controller 14 transmits an electromagnetic wave emission signal to the irradiation source 15 continuously.

When the propagation direction modifier 16 inclines the reflected surface in accordance with the drive signal whose signal value is a function of the elapsed time, the emission direction changes in accordance with the elapsed time. For example, the pixels px of the propagation unit 20 are scanned by the reflected waves of the electromagnetic waves over a predetermined trajectory lo corresponding to the elapsed time. While the reflected waves of the electromagnetic waves are incident on the pixels px in the second state, the first detector 17 does not detect the electromagnetic waves. Conversely, when the reflected waves of the electromagnetic waves are incident on the pixels px in the first state, the first detector 17 detects the electromagnetic waves.

The controller 14 calculates the signal value of the drive signal corresponding to the pixel px, at a predetermined position, in the first state based on the first related information and the second related information. Furthermore, based on the drive signal that is a function of elapsed time, the controller 14 calculates the estimated elapsed time, from the reference time, matching the signal value of the drive signal corresponding to the pixel px, at a predetermined position, in the first state.

Figure 11:
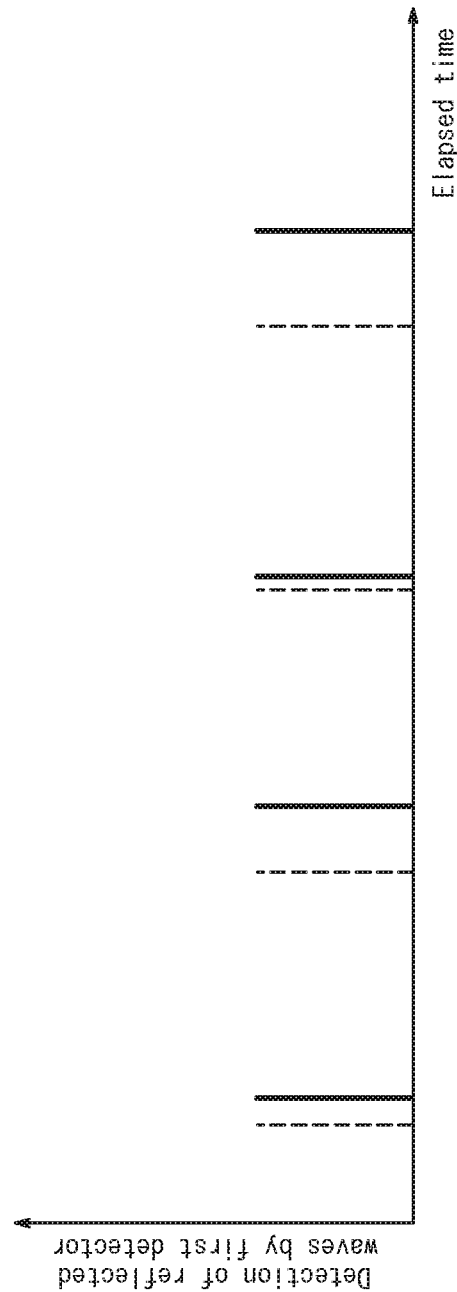
FIG. 11 is a graph of detection of reflected waves by the first detector versus elapsed time to illustrate the difference between the estimated elapsed time and the actual elapsed time at which the first detector detects reflected waves for a predetermined pixel when the first related information is updated in the electromagnetic wave detection apparatus of FIG. 1.

The controller 14 observes the actual elapsed time, from the reference time, at which the first detector 17 detects the reflected waves. When the emission direction of electromagnetic waves estimated for the drive signal matches the actual emission direction, the estimated elapsed time matches the actual elapsed time at which the reflected waves are incident on the pixel px, at a predetermined position, in the first state. Conversely, when the estimated emission direction and the actual emission direction differ, a difference also occurs between the estimated elapsed time (see the dashed line) and the actual elapsed time (see the solid line), as illustrated in FIG. 11. The controller 14 combines the latest actual elapsed time with the estimated elapsed time for each pixel px at a predetermined position.

Based on the estimated elapsed time combined with the actual elapsed time, the controller 14 identifies the pixel px that is in the first state and on which the reflected light is incident at the actual elapsed time. The controller 14 also uses the predetermined position of the identified pixel px to calculate the emission direction based on the second related information. The controller 14 uses the actual elapsed time to calculate the signal value of the drive signal based on the function of the drive signal. The controller 14 updates the first related information based on the calculated signal value and emission direction.

For example, when the first related information is a function yielding the emission direction of the electromagnetic waves as a function of the drive signal, the controller 14 updates the function based on the combination. The controller 14 stores the updated function as the new relationship between the drive signal and the emission direction of electromagnetic waves, i.e. as the new first related information, in the memory 13.

When, for example, the first related information is the emission direction associated individually with each signal value of the drive signal, the controller 14 stores the emission direction in each combination stored in the memory 13 as the emission direction associated with the corresponding signal value in the combination, i.e. as the new first related information, in the memory 13.

When, for example, the first related information is the signal value of the drive signal corresponding individually to each emission direction, the controller 14 stores the signal value in each combination stored in the memory 13 as the new signal value associated with each corresponding emission direction in the combination, i.e. as the new first related information, in the memory 13.

Figure 12:
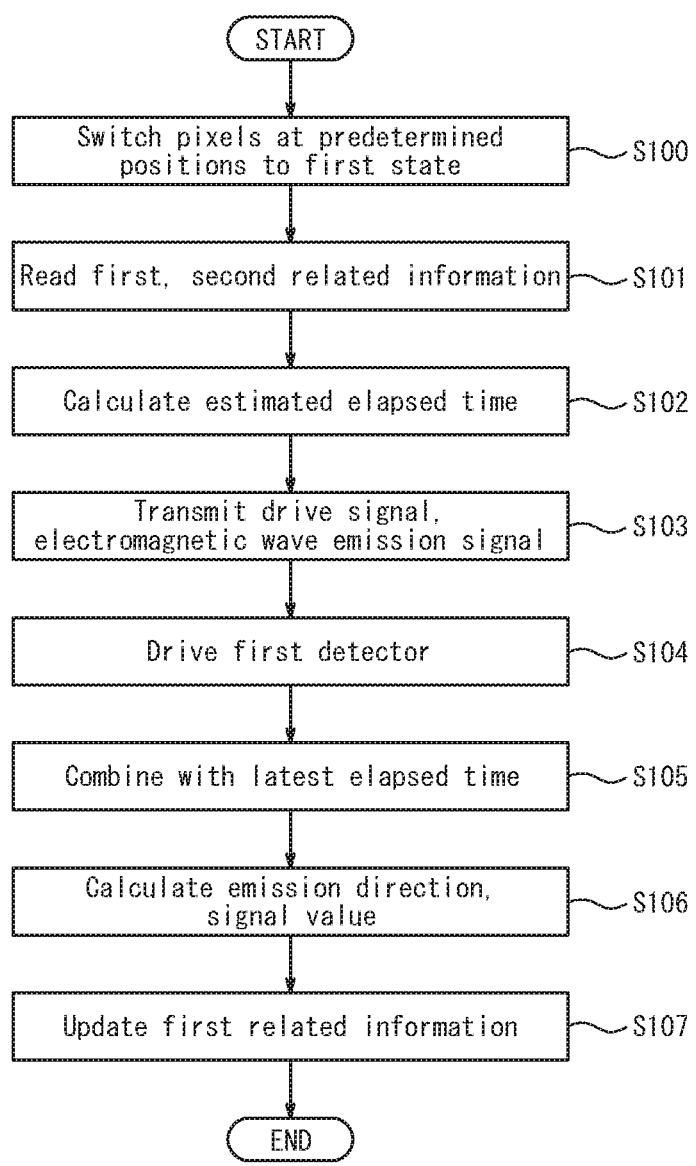
FIG. 12 is a flowchart illustrating processing, executed by the controller of FIG. 1, to update the first related information in the first embodiment.

Next, the processing executed by the controller 14 in the first embodiment to update the first related information is described with reference to the flowchart of FIG. 12. The controller 14 starts the processing to update the first related information when, for example, an input device of the electromagnetic wave detection apparatus 10 detects an operation to execute the processing to update the first related information.

In step S100, the controller 14 switches the pixels px at predetermined positions of the propagation unit 20 to the first state. When the controller 14 has switched the predetermined pixels px to the first state, the process proceeds to step S101.

In step S101, the controller 14 reads the first related information and the second related information from the memory 13. After the controller 14 reads the first related information and the second related information, the process proceeds to step S102.

In step S102, the controller 14 calculates the estimated elapsed time, from the reference time, when the reflected waves reach the predetermined pixels px that were changed to the first state in step S100. The controller 14 makes the calculation based on the function, read in step S101, yielding the signal value as a function of the elapsed time and based on the first related information and second related information. After the controller 14 calculates the estimated elapsed time, the process proceeds to step S103.

In step S103, the controller 14 transmits a drive signal, which is a function of the elapsed time, to the propagation direction modifier 16. The controller 14 also transmits an electromagnetic wave emission signal to the irradiation source 15 continuously. After the controller 14 transmits the drive signal and the electromagnetic wave emission signal, the process proceeds to step S104.

In step S104, the controller 14 drives the first detector 17. The controller 14 acquires the actual elapsed time, from the reference time, at which reflected waves are detected by driving of the first detector 17. When the controller 14 acquires the actual elapsed time, the process proceeds to step S105.

In step S105, the controller 14 combines the elapsed time estimated in step S102 with the latest actual elapsed time for each pixel px switched to the first state. After the controller 14 combines the elapsed times, the process proceeds to step S106.

In step S106, the controller 14 calculates the emission direction and the signal value of the drive signal for each of the estimated elapsed times and actual elapsed times combined in step S105. After the controller 14 calculates the signal value and the emission direction, the process proceeds to step S107.

In step S107, the controller 14 uses the combinations of signal values and emission directions calculated in step S106 to update the first related information stored in the memory 13. After updating the first related information, the controller 14 ends the processing to update the first related information.

The electromagnetic wave detection apparatus 10 of the first embodiment with the above configuration updates the information related to the emission direction based on the predetermined position of the pixel px that is propagating reflected waves towards the first detector 17 when the first detector 17 detects the reflected waves. This configuration allows the electromagnetic wave detection apparatus 10 of the first embodiment to reduce the difference between the orientation of the reflecting surface estimated from the signal values of the drive signal and the actual orientation of the reflecting surface. Therefore, the electromagnetic wave detection apparatus 10 of the first embodiment can reduce the difference between the actual emission direction of electromagnetic waves and the emission direction of electromagnetic waves estimated from the signal values of the drive signal. The effects of such a configuration are the same for the electromagnetic wave detection apparatus 10 of the second embodiment, described below.

In particular, based on the combination of the estimated elapsed time and the latest actual elapsed time for each pixel px at a predetermined position, the electromagnetic wave detection apparatus 10 of the first embodiment identifies the predetermined position of the pixel px that is propagating reflected waves towards the first detector 17 when the first detector 17 detects the reflected waves. The electromagnetic wave detection apparatus 10 of the first embodiment with this configuration can use a plurality of pixels px to update the information related to the emission direction during one scan of the propagation unit 20 with reflected waves. Accordingly, in a configuration that uses a plurality of pixels to update information related to the emission direction, the electromagnetic wave detection apparatus 10 of the first embodiment can shorten the detection time of reflected waves related to all of the pixels px used for updating.

The electromagnetic wave detection apparatus 10 of the first embodiment with the above configuration can switch each pixel px disposed on the action surface as of the propagation unit 20 between the first state and the second state. The electromagnetic wave detection apparatus 10 of the first embodiment with this configuration can align the optical axis of the pre-stage optical system 19 with the optical axis of the first post-stage optical system 21 in the first direction d1, in which electromagnetic waves are propagated in the first state, and with the optical axis of the second post-stage optical system 22 in the second direction d2, in which electromagnetic waves are propagated in the second state. Accordingly, the electromagnetic wave detection apparatus 10 of the first embodiment can reduce the misalignment between the optical axes of the first detector 17 and the second detector 18 by switching the pixels px of the propagation unit 20 between the first state and the second state. The electromagnetic wave detection apparatus 10 of the first embodiment can thereby reduce the misalignment of detection axes in the first detector 17 and the second detector 18. Therefore, the electromagnetic wave detection apparatus 10 of the first embodiment can reduce the misalignment of coordinate systems in the detection results of the first detector 17 and the second detector 18. The effects of such a configuration are the same for the electromagnetic wave detection apparatus 10 of the second embodiment, described below.

The electromagnetic wave detection apparatus 10 of the first embodiment can switch a portion of the pixels px in the propagation unit 20 to the first state and switch another portion of the pixels px to the second state. Accordingly, the electromagnetic wave detection apparatus 10 of the first embodiment can cause the first detector 17 to detect electromagnetic waves at a portion of pixels px while simultaneously causing the second detector 18 to detect electromagnetic waves at another portion of pixels px. The electromagnetic wave detection apparatus 10 of the first embodiment can thereby simultaneously acquire information relating to different regions. The effects of such a configuration are the same for the electromagnetic wave detection apparatus 10 of the second embodiment, described below.

The electromagnetic wave detection apparatus 10 of the first embodiment can switch the same pixel px in the propagation unit 20 to the first state and then to the second state. With this configuration, the first detector 17 can detect electromagnetic waves when the pixel px in the propagation unit 20 is in the first state, and immediately thereafter, the second detector 18 can detect electromagnetic waves when the pixel px is in the second state. The electromagnetic wave detection apparatus 10 of the first embodiment can therefore reduce the misalignment in the timing of electromagnetic wave detection by the first detector 17 and the second detector 18 for the same pixel px in the propagation unit 20. The electromagnetic wave detection apparatus 10 of the first embodiment can thereby reduce misalignment in the timing at which information relating to the same region is acquired. The effects of such a configuration are the same for the electromagnetic wave detection apparatus 10 of the second embodiment, described below.

The electromagnetic wave detection apparatus 10 of the first embodiment includes the irradiation source 15. Accordingly, by irradiating electromagnetic waves onto the object ob, the electromagnetic wave detection apparatus 10 of the first embodiment can cause the first detector 17 to function as an active sensor. The electromagnetic wave detection apparatus 10 of the first embodiment can also cause the second detector 18 to function as a passive sensor. With this configuration, the electromagnetic wave detection apparatus 10 of the first embodiment can switch at least one of the pixels px in the propagation unit 20 from the first state to the second state to cause both an active sensor and a passive sensor to acquire information relating to the same region. Furthermore, with this configuration, the electromagnetic wave detection apparatus 10 of the first embodiment can switch a portion of the pixels px in the propagation unit 20 to the first state and switch another portion of the pixels px to the second state to separate the region in which the active sensor acquires information from the region in which the passive sensor acquires information. The effects of such a configuration are the same for the electromagnetic wave detection apparatus 10 of the second embodiment, described below.

The electromagnetic wave detection apparatus 10 of the first embodiment includes the propagation direction modifier 16. With this configuration, the electromagnetic wave detection apparatus 10 of the first embodiment can scan the object ob using electromagnetic waves emitted by the irradiation source 15. In other words, the electromagnetic wave detection apparatus 10 of the first embodiment can cause the first detector 17 to cooperate with the propagation direction modifier 16 and function as a scanning-type active sensor. Accordingly, the electromagnetic wave detection apparatus 10 of the first embodiment can use the first detector 17 to acquire information in accordance with positions in one or two dimensions. The effects of such a configuration are the same for the electromagnetic wave detection apparatus 10 of the second embodiment, described below.

Next, an electromagnetic wave detection apparatus according to a second embodiment of the present disclosure is described. In the second embodiment, the method of updating the information related to the emission direction differs from the first embodiment. The second embodiment is described below, focusing on the differences from the first embodiment. The same reference signs are used for components with the same configuration as in the first embodiment.

Like the electromagnetic wave detection apparatus 10 of the first embodiment, an electromagnetic wave detection apparatus 10 according to the second embodiment includes an irradiator 11, an electromagnetic wave detector 12, a memory 13, and a controller 14. The configuration and functions of the irradiator 11, the electromagnetic wave detector 12, and the memory 13 in the second embodiment are the same as in the first embodiment. The configuration of the controller 14 in the second embodiment is the same as in the first embodiment. The functions of the controller 14 in the second embodiment other than to update the information related to the emission direction are the same as in the first embodiment. Details of the function, executed by the controller 14 of the second embodiment, to update the information related to the emission direction are described below.

In the second embodiment as well, the controller 14 updates the information related to the emission direction based on the position of the propagation element, in the propagation unit 20, that is propagating the reflected waves towards the first detector 17. In the second embodiment, the controller 14 updates the information related to the emission direction by updating the first related information. In a configuration with a fixed emission direction, as in the first embodiment, it suffices for the controller 14 to update the emission direction.

Unlike the first embodiment, the controller 14 in the second embodiment switches one pixel px at a predetermined position in the propagation unit 20 to the first state and switches the pixels px at other positions to the second state to update the information related to the emission direction.

As in the first embodiment, the controller 14 in the second embodiment transmits a drive signal, whose signal value is a function of the elapsed time from a reference time, to the propagation direction modifier 16. The controller 14 transmits an electromagnetic wave emission signal to the irradiation source 15 continuously.

As in the first embodiment, the controller 14 in the second embodiment observes the actual elapsed time, from the reference time, at which the first detector 17 detects the reflected waves. As in the first embodiment, the controller 14 in the second embodiment uses the actual elapsed time to calculate the signal value of the drive signal based on the function of the drive signal. As in the first embodiment, the controller 14 in the second embodiment also uses the predetermined position of the pixel px switched to the first state to calculate the emission direction based on the second related information.

Unlike the first embodiment, the controller 14 in the second embodiment stores a combination of the calculated signal value of the drive signal and the calculated emission direction in the memory 13. When a plurality of pixels px are used to update the first related information in the second embodiment, then unlike the first embodiment, the controller 14 further switches a single pixel px at a different position to the first state, switches the other pixels px to the second state, and calculates the signal value of the drive signal and the emission direction with respect to the single pixel px at the different position. The controller 14 stores a combination of the signal value of the drive signal and the emission direction in the memory 13. Subsequently, the controller 14 performs similar control the same number of times as the number of pixels px used to update the first related information, storing a combination of the signal value of the drive signal and the emission direction in the memory 13.

The controller 14 updates the first related information based on the combinations, stored in the memory 13, of the signal value and emission direction. The method of updating the first related information is the same as in the first embodiment.

Figure 13:
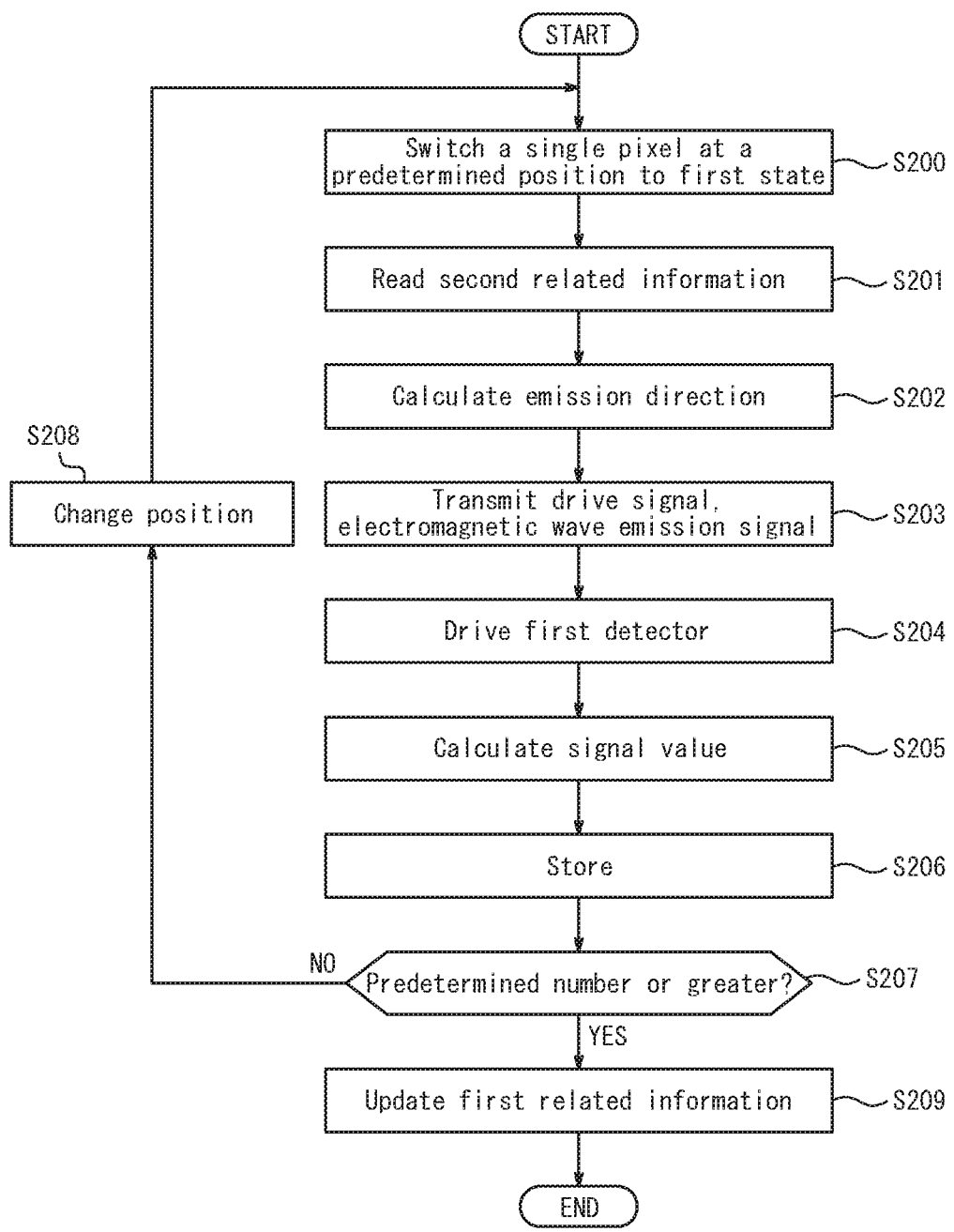
FIG. 13 is a flowchart illustrating processing, executed by the controller of FIG. 1, to update the first related information in a second embodiment.

Next, the processing executed by the controller 14 in the second embodiment to update the first related information is described with reference to the flowchart of FIG. 13. The controller 14 starts the processing to update the first related information when, for example, an input device of the electromagnetic wave detection apparatus 10 detects an operation to execute the processing to update the first related information.

In step S200, the controller 14 switches a single pixel px at a predetermined position of the propagation unit 20 to the first state. When the controller 14 has switched the single pixel px at the predetermined position to the first state, the process proceeds to step S201.

In step S201, the controller 14 reads the second related information from the memory 13. After the controller 14 reads the second related information, the process proceeds to step S202.

In step S202, the controller 14 uses the predetermined position of the single pixel px that was switched to the first state in step S200 to calculate the emission direction based on the second related information read in step S201. After the controller 14 calculates the emission direction, the process proceeds to step S203.

In step S203, the controller 14 transmits a drive signal, which is a function of the elapsed time, to the propagation direction modifier 16. The controller 14 also transmits an electromagnetic wave emission signal to the irradiation source 15 continuously. After the controller 14 transmits the drive signal and the electromagnetic wave emission signal, the process proceeds to step S204.

In step S204, the controller 14 drives the first detector 17. The controller 14 acquires the actual elapsed time, from the reference time, at which reflected waves are detected by driving of the first detector 17. When the controller 14 acquires the actual elapsed time, the process proceeds to step S205.

In step S205, the controller 14 uses the actual elapsed time acquired in step S204 to calculate the signal value of the drive signal based on the function of the drive signal. After the controller 14 calculates the signal value of the drive signal, the process proceeds to step S206.

In step S206, the controller 14 stores a combination of the emission direction calculated in step S202 and the signal value of the drive signal calculated in step S205 in the memory 13. After the controller 14 stores the calculated emission direction and signal value, the process proceeds to step S207.

In step S207, the controller 14 judges whether the number of combinations stored in step S206 is a predetermined number or greater. When the number of combinations is not the predetermined number or greater, the process proceeds to step S208. When the number of combinations is the predetermined number or greater, the process proceeds to step S209.

In step S208, the controller 14 changes the predetermined position of the pixel px to be changed to the first state to a position that has not yet been changed. When the controller 14 has switched the predetermined position, the process returns to step S200.

In step S209, the controller 14 uses the combinations of signal values and emission directions calculated in step S206 to update the first related information stored in the memory 13. After updating the first related information, the controller 14 ends the processing to update the first related information.

The electromagnetic wave detection apparatus 10 of the second embodiment with this configuration switches a single pixel px to the first direction d1 during one scan of the propagation unit 20 by reflected waves. Even when the difference between the estimated emission direction and the actual emission direction is relatively large, this configuration allows the electromagnetic wave detection apparatus 10 of the second embodiment to accurately combine the drive signal and the position of the pixel px that propagates reflected waves towards the first detector 17 when the reflected waves are detected. Accordingly, the electromagnetic wave detection apparatus 10 of the second embodiment can very accurately reduce the difference between the estimated emission direction and the actual emission direction even when this difference is relatively large.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

For example, when the emission direction of the electromagnetic waves from the irradiator 11 is fixed in the first and second embodiments, the information related to the emission direction may be updated by a configuration such as the modification below. In this modification, the controller 14 changes the pixels px of the propagation unit 20 to the first state in order while causing electromagnetic waves to be emitted continuously. The controller 14 calculates the emission direction based on the second related information, using the position of the pixel px that was switched to the first state when the first detector 17 detects the reflected waves. The controller 14 uses the calculated emission direction to update the information related to the emission direction stored in the memory 13.

In the first and second embodiments, the propagation unit 20 can switch the travel direction of the electromagnetic waves incident on the action surface as between two directions, i.e. the first direction d1 and the second direction d2, but the propagation unit 20 may instead be capable of switching the travel direction among three or more directions.

In the first and second embodiments, the first state of the propagation unit 20 is a first reflecting state for reflecting the electromagnetic waves incident on the action surface as in the first direction d1, and the second state of the propagation unit 20 is a second reflecting state for reflecting these electromagnetic waves in the second direction d2. This configuration is not, however, limiting.

For example, the second state may be a transmitting state for transmitting the electromagnetic waves incident on the action surface as for the electromagnetic waves to propagate in the second direction d2. In greater detail, the propagation unit 20 may include a shutter, on each pixel px, that has a reflecting surface that reflects electromagnetic waves. The propagation unit 20 with this configuration can open and close the shutter of each pixel px to switch each pixel px between the first reflecting state and the transmitting state that is the second state. An example of the propagation unit 20 with such a configuration is a propagation unit that includes a MEMS shutter including a plurality of openable shutters arranged in an array. Another example of the propagation unit 20 is a propagation unit that includes a liquid crystal shutter capable of switching, in accordance with liquid crystal orientation, between the reflecting state for reflecting electromagnetic waves and the transmitting state for transmitting electromagnetic waves. The propagation unit 20 with this configuration can switch each pixel px between the reflecting state as the first state and the transmitting state as the second state by switching the liquid crystal orientation of each pixel px.

In the electromagnetic wave detection apparatus 10 of the first and second embodiments, the first detector 17 functions as a portion of an active sensor, and the second detector 18 is a passive sensor. The electromagnetic wave detection apparatus 10 is not, however, limited to this configuration. For example, the electromagnetic wave detection apparatus 10 can achieve similar effects as in the first embodiment when the first detector 17 and the second detector 18 are both passive sensors and when both function as a portion of an active sensor.

In the first and second embodiments, the electromagnetic wave detection apparatus 10 is configured to include the irradiation source 15, the propagation direction modifier 16, the memory 13, the controller 14, and the electromagnetic wave detector 12, but the electromagnetic wave detection apparatus 10 may be configured to include at least one of these components. An electromagnetic wave detection system may be configured so that the electromagnetic wave detection apparatus 10 includes at least the electromagnetic wave detector 12, with another apparatus including the other components.

In the first and second embodiments, the electromagnetic wave detection apparatus 10 is configured so that the propagation direction modifier 16 scans the beam of electromagnetic waves emitted by the irradiation source 15, thereby causing the first detector 17 to cooperate with the propagation direction modifier 16 and function as a scanning-type active sensor. The electromagnetic wave detection apparatus 10 is not, however, limited to this configuration. For example, the electromagnetic wave detection apparatus 10 can achieve similar effects as in the first and second embodiments, without including the propagation direction modifier 16, by causing electromagnetic waves to be emitted radially from the irradiation source 15 and by acquiring information without scanning.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

A machine-readable, non-transitory storage medium may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic and optical storage media (such as a compact disk (CD), laser Disc® (laser disc is a registered trademark in Japan, other countries, or both), digital versatile disc (DVD), floppy disk, and Blu-ray Disc), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

10 Electromagnetic wave detection apparatus
11 Irradiator
12 Electromagnetic wave detector
13 Memory
14 Controller
15 Irradiation source
16 Propagation direction modifier
17 First detector
18 Second detector
19 Pre-stage optical system
20 Propagation unit
21 First post-stage optical system
22 Second post-stage optical system
as Action surface
d1 First direction
d2 Second direction
ob Object
px, px1, px2 Pixel

The invention claimed is:

1. An electromagnetic wave detection apparatus comprising:
an irradiator configured to emit electromagnetic waves;
a first detector configured to detect reflected waves of the electromagnetic waves irradiated onto an object;
a propagation unit comprising a plurality of propagation elements that, each of irradiation position of the electromagnetic waves irradiated onto the object, switch between propagating and not propagating the reflected waves towards the first detector;
a memory configured to store information related to an emission direction of the electromagnetic waves; and
a controller configured to update the information related to the emission direction based on a position of a propagation element that is propagating the reflected waves towards the first detector when the first detector detects the reflected waves.

2. The electromagnetic wave detection apparatus of claim 1,
wherein the irradiator irradiates the electromagnetic waves on the object while changing an irradiation position by changing the emission direction of the electromagnetic waves in accordance with a drive signal;
wherein the memory is configured to store first related information associating the drive signal and the emission direction as the information related to the emission direction; and
wherein the controller is configured to update the information related to the emission direction by updating the first related information, based on the position of the propagation element that is propagating the reflected waves towards the first detector when the first detector detects the reflected waves and based on the drive signal when the first detector detects the reflected waves.

3. The electromagnetic wave detection apparatus of claim 2,
wherein the memory comprises second related information associating the emission direction and the position of the propagation element on which the reflected waves of the electromagnetic waves emitted in the emission direction are incident; and
wherein the controller is configured to update the first related information, based on the emission direction based on the second related information and the position of the propagation element that is propagating the reflected waves towards the first detector when the first detector detects the reflected waves, and based on the drive signal when the first detector detects the reflected waves.

4. The electromagnetic wave detection apparatus of claim 2, wherein the controller is configured to update the first related information by updating a relationship between the drive signal and the emission direction in the first related information.

5. The electromagnetic wave detection apparatus of claim 2, wherein the controller is configured to update the first related information by updating a function indicating a correlation between the drive signal and the emission direction in the first related information.

6. The electromagnetic wave detection apparatus of claim 2,
wherein the first related information is a plurality of signal values of the drive signal and the emission direction associated with each signal value of the plurality of signal values; and
wherein the controller is configured to update the first related information by updating an association between the plurality of signal values of the drive signal and the emission direction in the first related information.

7. The electromagnetic wave detection apparatus of claim 6, wherein the controller is configured to update the first related information by updating the plurality of signal values of the drive signal in the first related information.

8. The electromagnetic wave detection apparatus of claim 2, wherein the controller is configured to update the first related information by updating the emission direction in the first related information.

9. The electromagnetic wave detection apparatus of claim 2, wherein the irradiator comprises a reflecting surface configured to reflect the emitted electromagnetic waves while changing orientation in accordance with the drive signal so as to irradiate the electromagnetic waves on the object while changing the irradiation position.

10. The electromagnetic wave detection apparatus of claim 1, wherein the propagation unit is configured to switch each propagation element of the plurality of propagation elements between a first state of propagating the reflected waves in a first direction in which the first detector is disposed and a second state of propagating the reflected waves in a second direction different from the first direction.

11. The electromagnetic wave detection apparatus of claim 10, wherein the controller switches at least one propagation element among the plurality of propagation elements to the first state, and treats a position of the propagation element switched to the first state as the position of the propagation element that is propagating the reflected waves towards the first detector when the first detector detects the reflected waves.

12. The electromagnetic wave detection apparatus of claim 10, further comprising a second detector disposed in the second direction from the propagation unit and configured to detect the reflected waves that are incident on the second detector.

13. A non-transitory computer-readable recording medium that stores a control program for causing an apparatus to execute processes comprising:
emitting electromagnetic waves;
detecting, using a first detector, reflected waves of the electromagnetic waves irradiated onto an object;
causing a portion of a plurality of propagation elements, configured to switch between propagating and not propagating the reflected waves towards the first detector, to propagate the reflected waves towards the first detector each of irradiation position of the electromagnetic waves irradiated onto the object;
storing information related to an emission direction of the electromagnetic waves; and
updating the information related to the emission direction based on a position of a propagation element that is propagating the reflected waves towards the first detector when the first detector detects the reflected waves.

14. An electromagnetic wave detection system comprising:
an irradiator configured to emit electromagnetic waves;
a first detector configured to detect reflected waves of the electromagnetic waves irradiated onto an object;
a propagation unit comprising a plurality of propagation elements that, each of irradiation position of the electromagnetic waves irradiated onto the object, switch between propagating and not propagating the reflected waves towards the first detector;
a memory configured to store information related to an emission direction of the electromagnetic waves; and
a controller configured to update the information related to the emission direction based on a position of a propagation element that is propagating the reflected waves towards the first detector when the first detector detects the reflected waves.

* * * * *